(12) United States Patent
Chen et al.

(10) Patent No.: US 11,482,915 B2
(45) Date of Patent: Oct. 25, 2022

(54) RADIAL-AXIAL AIR GAP THREE-PHASE DISC-TYPE TRANSVERSE FLUX PERMANENT MAGNET MOTOR

(71) Applicant: Nanjing University of Aeronautics and Astronautics, Nanjing (CN)

(72) Inventors: Zhihui Chen, Nanjing (CN); Jiaxin Chen, Nanjing (CN); Jinjin Duan, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/191,652

(22) Filed: Mar. 3, 2021

(65) Prior Publication Data
US 2022/0052589 A1 Feb. 17, 2022

(30) Foreign Application Priority Data
Aug. 12, 2020 (CN) .......................... 202010805422.1

(51) Int. Cl.
*H02K 21/14* (2006.01)
(52) U.S. Cl.
CPC ....... *H02K 21/145* (2013.01); *H02K 2201/12* (2013.01); *H02K 2213/03* (2013.01)
(58) Field of Classification Search
CPC ...... H02K 21/00; H02K 21/04; H02K 21/046; H02K 21/14; H02K 21/145; H02K 21/16; H02K 21/22; H02K 21/227; H02K 21/24; H02K 21/44; H02K 37/12; H02K 37/125; H02K 1/00; H02K 1/02; H02K 1/14; H02K 1/20; H02K 1/27; H02K 1/2706; H02K 1/271; H02K 1/2713; H02K 1/22; H02K 1/227; H02K 1/274
See application file for complete search history.

(56) References Cited

U.S. PATENT DOCUMENTS

| | | | |
|---|---|---|---|
| 6,949,855 B2 * | 9/2005 | Dubois | H02K 21/125 310/156.01 |
| 2010/0237822 A1 * | 9/2010 | Hiramoto | H02K 21/12 318/718 |

(Continued)

*Primary Examiner* — Tran N Nguyen
(74) *Attorney, Agent, or Firm* — Hassan Abbas Shakir; Shakir Law PLLC

(57) ABSTRACT

Disclosed is a radial-axial air gap three-phase disc-type transverse flux permanent magnet motor. Each phase includes a stator consisting of shoe-shaped stator cores and shoe-shaped permanent magnets, and a radial-axial rotor. The permanent magnets are magnetized in the circumferential direction, and the magnetization directions of the two adjacent permanent magnets are opposite to each other. Armature windings are wound in the grooves formed by the alternately arranged stator cores and the permanent magnets. The radial-axial rotor includes radial teeth, axial teeth, and right-angled yokes. The radial teeth are connected to the axial teeth through the right-angled yokes. Adjacent radial/ or axial teeth are spaced at a mechanical angle of 360/n degrees. Radial teeth and the adjacent axial teeth under the same pole pairs are spaced at a mechanical angle of 180/n degrees, where n is the number of pole pairs of the radial-axial air gap three-phase disc-type transverse flux permanent magnet motor.

6 Claims, 5 Drawing Sheets

(56) References Cited

U.S. PATENT DOCUMENTS

2014/0125157 A1\* 5/2014 Kou .................. H02K 1/17
　　　　　　　　　　　　　　　　　310/49.43
2016/0105088 A1\* 4/2016 Narita ............... H02K 19/10
　　　　　　　　　　　　　　　　　310/216.091

\* cited by examiner

RADIAL-AXIAL AIR GAP THREE-PHASE DISC-TYPE TRANSVERSE FLUX PERMANENT MAGNET MOTOR

TECHNICAL FIELD

The present disclosure belongs to the technical field of transverse flux permanent magnet motors.

BACKGROUND

The transverse flux motor structure was proposed by German Professor Herbert Weh in the early 1980s. A stator tooth and an armature winding of this structure are perpendicular to each other in space, and the tooth width and the coil cross-section size can be designed independently, which can achieve greater torque density fundamentally. A transverse flux permanent magnet motor has the characteristics of low speed and large torque, and has the advantages of low interphase coupling, strong fault tolerant capability, and the like, so it is particularly suitable for the fields of electric direct drive, such as wind power generation, electric vehicles, helicopters, and ship drive.

Since the development of the transverse flux permanent magnet motor, multiple topological structures have been proposed on the basis of prototypes, which can be divided into a surface mounted structure, a flux-concentrating structure, and a passive rotor structure according to different placements of permanent magnets of a rotor. The surface mounted structure is relatively simple, but the utilization rate of the permanent magnets is low. The passive rotor structure has high reliability, but the using quantity of permanent magnets increases. The flux-concentrating structure has high air gap flux density, and meanwhile, is complex in structure.

In the early stage, the Royal Navy and the Rolls. Royce Company of Britain cooperatively developed a 3 MW transverse flux permanent magnet motor for frigate propulsion. The two-sided structure can achieve double torque when the motor size increases slightly, but cannot increase the motor torque generated by the same effective material. Peradeniya, Sri Lanka University and the Royal Institute of technology in Stockholm, Sweden cooperatively developed a three-phase circumferentially arranged transverse flux permanent magnet motor. A rotor is embedded in a C-type stator core, and the permanent magnets on the disc-type rotor is axially magnetized. The motor can achieve superior torque density, but has low power factor. Vienna University of Science and Technology in Australia proposed a flux-concentrating two-sided stator structure. Permanent magnets are embedded into a rotor core and is magnetized in the circumferential direction. Stator yoke is manufactured by SMC material compacting. The research of the transverse flux permanent magnet motor was started later in China. The research of the transverse flux permanent magnet motor has been included in the High-Tech Research and Development plan in China (863 plan). In recent years, many universities have carried out researches on transverse flux permanent magnet motors, and some achievements have been reached. In a transverse flux permanent magnet motor proposed by Shenyang University of Technology, a stator core is formed by winding silicon steel sheets, and built-in flux-concentrating rotor and stator structures can effectively reduce the eddy current loss of the motor and improve the motor efficiency and the material utilization rate. A three-phase 5 kW prototype is designed and manufactured, this prototype has high torque density and high power factor, but the utilization rate of the permanent magnet is low due to the none two-sided structure. The research group of Professor Qiu Arui of Tsinghua University proposed a novel flux-concentrating transverse flux permanent magnet motor structure. Magnetic poles of a rotor adopt a three-wall flux-concentrating structure, and a U-shaped stator core is adopted. The structure makes the function of flux-concentrating of permanent magnets better, improves the flux density in air gap, and meanwhile, simplifies the stator core structure, but the using quantity of the permanent magnets is relatively high and the rotor structure is relatively complex. Zhejiang University proposed a hybrid core structure based on the three-dimensional magnetic field characteristics of the transverse flux permanent magnet motor. Stator teeth are made of silicon steel, a stator yoke is made of SMC, and permanent magnets are placed on a rotor core. The prototype can achieve relatively high torque density, but flux-concentrating structure is not adopted. Xiangtan University proposed a radial magnetized dual-winding transverse flux permanent magnet generator. The generator adopts a single-rotor dual-stator structure, so that it has double windings; the rotor is placed between the two stators; a pair of permanent magnets are embedded into each rotor core, which makes full use of the space of this structure and improves the utilization rate of the permanent magnets.

However, the permanent magnets of the above transverse flux permanent magnet motors are placed on the rotors. In view of serious vibration and heat radiation problems of the permanent magnets in some application occasions, passive rotor transverse flux permanent magnet motors are proposed. However, there are few literatures about the passive rotor transverse flux permanent magnet motor.

In the passive rotor transverse flux permanent magnet motor prosed by Professor B. E. Hasubek et al. of Alberta University in Canada, both a permanent magnet and a winding are placed on a stator, and a rotor is tilted by a pole pitch. The structure is convenient to cool, the mechanical impact sensitivity is reduced, and the same torque density as that of an active rotor structure is obtained. However, there is no magnetically conductive material connected between rotor cores of the structure, so the leakage flux is great, and the utilization rate of the permanent magnets is not high.

Professor Kou Baoquan et al. of Harbin Institute of Technology proposed a novel passive rotor transverse flux permanent magnet motor. Both armature windings and permanent magnets are placed on a stator. The stator consists of a radial stator ring and an axial stator bridge. The permanent magnets are surface-mounted in the stator. The motor is convenient to cool, the rotor structure is simple and reliable, and relatively high torque density is realized when the using quantity of the permanent magnets is low. However, the stator is complex in structure, and the air gap magnetic density is relatively low due to the non flux-concentrating structure.

SUMMARY

The objective of the present disclosure: in order to solve the problems of low permanent magnet utilization rate, low air gap flux density, and the like of a passive rotor transverse flux permanent magnet motor in the prior art, the present disclosure provides a radial-axial air gap three-phase disc-type transverse flux permanent magnet motor.

Technical solution: the present disclosure provides a radial-axial air gap three-phase disc-type transverse flux permanent magnet motor, including a stator, a rotor, and three armature windings. The stator is annular cylindrical, and includes three sector-shaped annular stator sections of the same structure. Each stator section includes p shoe-shaped permanent magnets and p+1 shoe-shaped stator pole cores, where p is an even number less than or equal to 2k, and k is a positive integer greater than or equal to one. Stator sections with grooves are formed by arranging the stator cores and the permanent magnets alternately in the circumferential direction of the stator sections, and a space exists between two adjacent stator sections. Shoe-shaped teeth of the stator cores and shoe-shaped teeth of the permanent magnets form an inner ring of the annular cylindrical stator. The outer sides of the stator cores and the outer sides of the permanent magnets form an outer ring of the stator. In a stator section, any permanent magnet is circumferentially magnetized in the circumferential direction, and the magnetization directions of two adjacent permanent magnets are opposite. The rotor is annular cylindrical, and includes n radial-axial rotor units, where n=3k+1 or 3k+2. The n radial-axial rotor units are connected in sequence. The n radial-axial rotor units are of the same structures. Each of the n radial-axial rotor units includes one radial tooth, first and second axial teeth, and one right-angled yoke. The first and second axial teeth, and the radial tooth are arranged on the right-angled yoke. In the rotor, adjacent radial teeth are spaced at a mechanical angle of 360/n degrees; adjacent first axial teeth are spaced at a mechanical angle of 360/n degrees; adjacent second axial teeth are spaced at a mechanical angle of 360/n degrees. The stator is arranged inside the rotor, and the centers of circles of the stator and the rotor are coincided. The three armature windings are respectively wound in the grooves of the three stator sections.

Further, the radial tooth is arranged on the radial inner side of the right-angled yoke. The first axial tooth and the second axial tooth are respectively arranged axially on both inner sides of the right-angled yoke. The n radial teeth inner sides of the right-angled yoke form a cylinder inner wall of the annular rotor. In each radial-axial rotor unit, the circumferential positions of the first axial tooth and the second axial tooth are aligned with each other. The circumferential position of the radial tooth and the circumferential positions of the first axial tooth and the second axial tooth are staggered at a mechanical degree of 180/n.

Further, the armature windings are run-track type armature windings.

Further, the circumferential radians of the 2nd to the pth stator cores of each stator section are U, and the circumferential radians of the first and the (p+1)th stator cores on the outermost side of the stator section are U/2.

Further, teeth of the stator cores are laminated by silicon steel sheets or manufactured by a soft magnetic composite material; yoke parts of the stator cores are manufactured by compacting a soft magnetic composite material.

Further, teeth of the rotors of the radial-axial units are laminated by silicon steel sheets or manufactured by soft magnetic composite material; the right-angled yokes are manufactured by compacting soft magnetic composite material.

Beneficial Effect:

1. The radial-axial air gap three-phase disc-type transverse flux permanent magnet motor is of a radial-axial rotor structure, and main flux flows through the circumferential outer surface and the axial end surface of the stator, so as to increase the flux linkage of an armature winding, increase the electromagnetic torque under the same armature ampere turns, and improve the torque density of the motor; adjacent permanent magnets simultaneously concentrating flux to the middle stator core in the circumferential direction, and each permanent magnet provides effective magnetomotive force at the same time. Compared with the existing transverse flux motor with a passive rotor the utilization rate of the permanent magnets is improved.

2. The shoe-shaped stator pole cores of the radial-axial air gap three-phase disc-type transverse flux permanent magnet motor increase the area of a stator tooth surface facing an air gap, increase the cross sections of grooves, and increase the number of turns of the windings, so that the flux linkage increases, the back electromagnetic force increases, and the power density is improved when the same current is conducted.

3. The permanent magnets of the radial-axial air gap three-phase disc-type transverse flux permanent magnet motor are located on the stator, so the permanent magnets have low vibration, and are easy to cool.

4. The yoke parts of the stator and rotor cores of the radial-axial air gap three-phase disc-type transverse flux permanent magnet motor are made of soft magnetic composite materials; there is hardly any loss induced by magnetic path gaps; in addition, the internal eddy current loss of the stator and rotor cores is reduced due to the insulation property of the soft magnetic composite material, thereby improving the efficiency of the motor.

Figure 1:
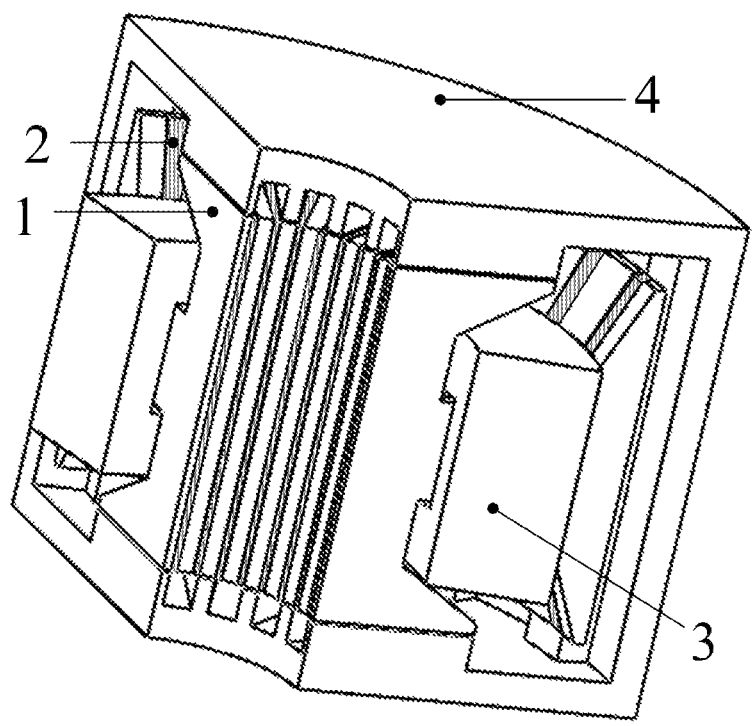
FIG. 1 is a one phase structure of a motor of the present disclosure.
Figure 2:
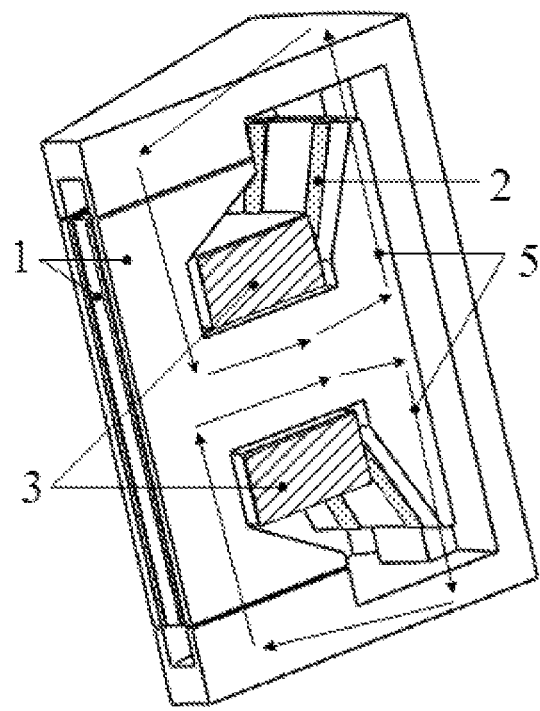
FIG. 2 is a section view of a pair of poles of a transverse flux permanent magnet motor of the present disclosure when the flux linkage of the armature winding reaches the maximum.
Figure 3:
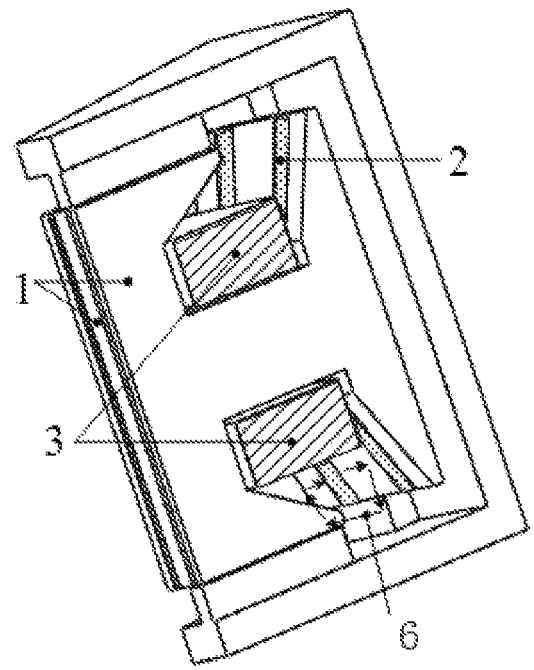
FIG. 3 is a section view of a pair of poles after the motor of the present disclosure rotates by ½ pole pitch anticlockwise from the position at which the flux is the maximum.
Figure 4:
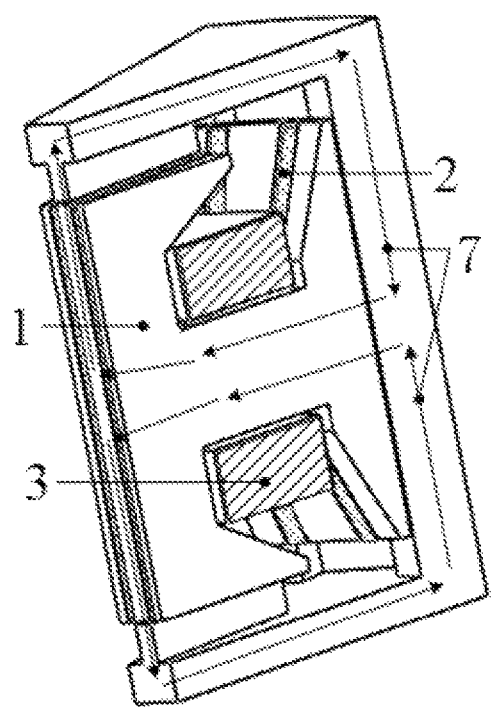
FIG. 4 is a section view of a pair of poles after the motor of the present disclosure rotates by 1 pole pitch anticlockwise from the position at which the flux is the maximum.
Figure 5:
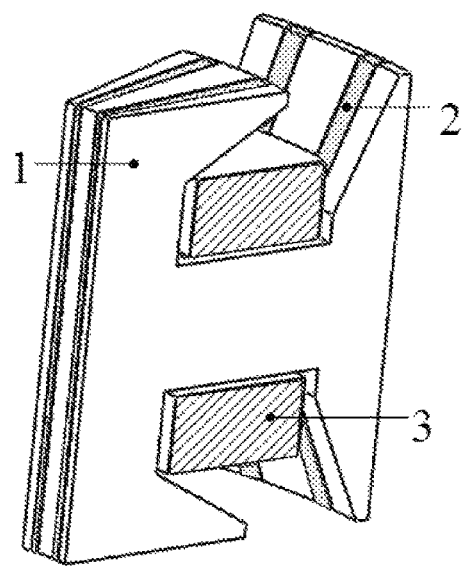
FIG. 5 is a stator structure of a pair of poles of the present disclosure.

Reference numerals in the accompanying drawings: 1—stator core; 2—permanent magnet; 3—armature winding; 4—rotor; 5—the main excitation flux path when the motor is located at the position of FIG. 2; 6—the main excitation flux path when the motor is located at the position of FIG. 3; 7—the main excitation flux path when the motor is located at the position of FIG. 4; 8—the 1st axial tooth; 9—right-angled yoke; 10—radial tooth.

DETAILED DESCRIPTION

The accompanying drawings, which constitute a part of the present disclosure, are used to provide further understanding of the present disclosure, and the exemplary embodiments of the present disclosure and the description thereof are used to explain the present disclosure, but do not constitute improper limitations to the present disclosure.

As shown in FIGS. 1 to 5, the present disclosure provides a radial-axial air gap three-phase disc-type transverse flux permanent magnet motor, including a stator, a rotor 4, and three armature windings. The stator includes three sector-shaped annular stator sections of the same structure. Each stator section includes p shoe-shaped permanent magnets and p+1 shoe-shaped stator cores 1, and p is an even number less than or equal to 2k, and k is a positive integer greater than or equal to one. Stator sections with grooves are formed by arranging the stator cores and the permanent magnets alternately in the circumferential direction; three stator sections form an annular cylindrical stator; a space exists between two adjacent stator sections. Shoe-shaped teeth of the stator cores and shoe-shaped teeth of the permanent magnets form an inner ring of the annular cylindrical stator. The outer sides of the stator cores and the outer sides of the permanent magnets form an outer ring of the annular cylindrical stator. In any stator section, any permanent magnet is circumferentially magnetized in the circumferential direction of the stator section, and the magnetization directions of two adjacent permanent magnets are opposite. The rotor 4 includes n radial-axial rotor units, where n=3k+1 or 3k+2. The n radial-axial rotor units are connected in sequence to form an annular cylindrical rotor. The n radial-axial rotor units are of the same structures. Each of the n radial-axial rotor units includes one radial tooth 10, first and second axial teeth 8, and one right-angled yoke 9; the first and second axial teeth and the radial tooth are arranged on the right-angled yoke. In the annular cylindrical rotor, adjacent radial teeth 10 are spaced at a mechanical angle of 360/n degrees; adjacent first axial teeth 8 are spaced at a mechanical angle of 360/n degrees; adjacent second axial teeth are spaced at a mechanical angle of 360/n degrees. The annular cylindrical stator is arranged in the annular cylindrical rotor, and the centers of circles of the annular cylindrical stator and the annular cylindrical rotor are overlapped. The three armature windings 3 are respectively wound in the grooves of the three stator sections, where n is the number of the pole pairs of the radial-axial air gap three-phase disc-type transverse flux permanent magnet motor.

Two adjacent permanent magnets simultaneously concentrate flux to the middle stator core in the circumferential direction. A magnetic circuit passes through a core on the radial outer side of the stator, the radial air gap, the radial rotor tooth, the right-angled yokes, axial rotor tooth, axial air gap, the stator tooth, and then passes through the stator yoke to return to core on the radial outer side of the stator to form a three-dimensional closed magnetic circuit.

Figure 6:
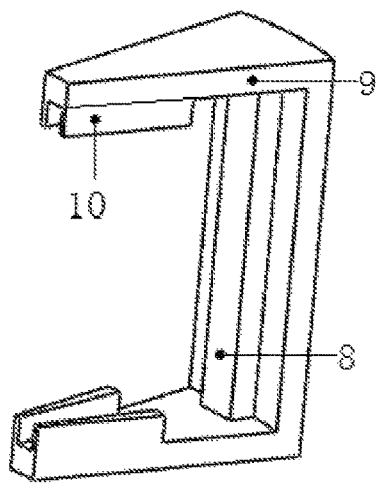
FIG. 6 is a rotor structure of a pair of poles of the present disclosure.

Preferably, each right-angled yoke includes a radial inner side and two axial inner sides. The radial tooth is arranged on the radial inner side of the right-angled yoke; the first and second axial teeth are respectively arranged on the two axial inner sides of the right-angled yoke. The n radial teeth inside the right-angled yokes form a cylinder inner wall of the annular cylindrical rotor. In each radial-axial rotor unit, the circumferential positions of the first axial tooth and the second axial tooth are aligned with each other. As shown in FIG. 6, in the same pair of poles, the circumferential position of the radial tooth and the circumferential positions of the first axial tooth and the second axial tooth are staggered at a mechanical degree of 180/n.

Preferably, the armature windings 3 are run-track type armature windings.

Preferably, the circumferential radians of the second to the pth stator cores of each stator section are U, and the circumferential radians of the first and the (p+1)th stator cores on the outermost side of the stator section are U/2.

Preferably, tooth parts of the stator cores are laminated by silicon steel sheets or manufactured by soft magnetic composite material; yoke parts of the stator cores are manufactured by compacting soft magnetic composite material.

Preferably, tooth parts of the rotors of the radial-axial units are laminated by silicon steel sheets or manufactured by soft magnetic composite material; the right-angled yokes are manufactured by compacting soft magnetic composite material.

The present embodiment adopts a 16-pair pole radial-axial air gap three-phase disc-type transverse flux permanent magnet motor. Each stator section includes eight shoe-shaped permanent magnets and nine shoe-shaped stator cores. The stator cores and the permanent magnets are arranged alternately in the circumferential direction. The circumferential radians of the two stator cores on the outermost side are half of the circumferential radians of the stator cores at other positions. The rotor includes 16 radial-axial rotor units, which has 16 radial teeth, 16 right-angled yokes, and 32 axial teeth. The radial teeth are connected to the axial teeth through the right-angled yokes. Adjacent radial teeth are spaced at an electric angle of 360 degrees, namely, a mechanical angle of 22.5 (360/16) degrees. Adjacent axial teeth are spaced at an electric angle of 360 degrees, namely, a mechanical angle of 22.5 (360/16) degrees. The radial tooth and the axial tooth under the same pair of poles are spaced at an electric angle of 180 degrees, namely, a mechanical angle of 11.25 (180/16) degrees. The permanent magnets are magnetized in the circumferential directions, and the magnetization directions of two adjacent permanent magnets are opposite. The run-track type armature windings are wound in the grooves formed by the stator cores and the permanent magnets after being arranged alternately.

Figure 7:
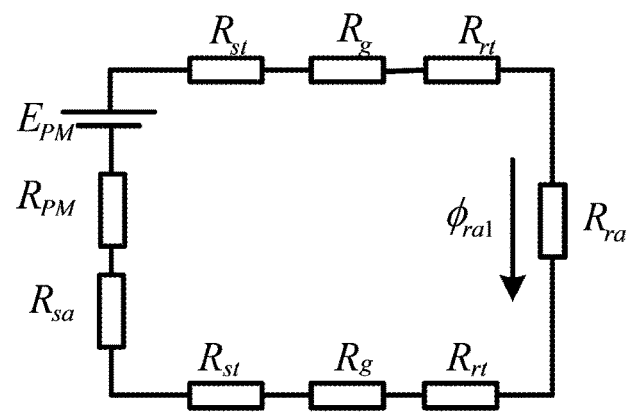
FIG. 7 is a corresponding equivalent magnetic circuit diagram of the transverse flux permanent magnet motor of the present disclosure when the flux is the maximum.
Figure 8:
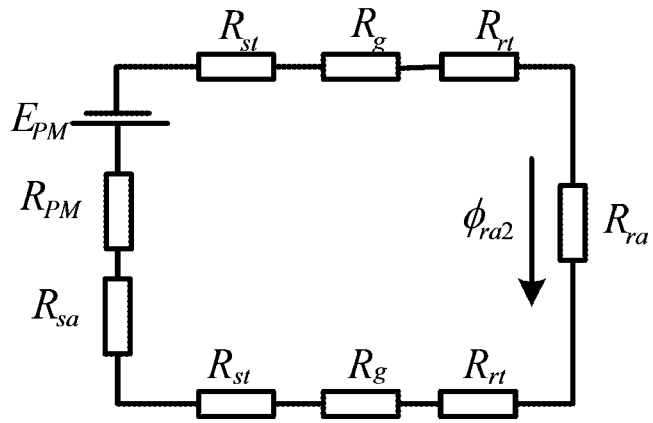
FIG. 8 is a corresponding equivalent magnetic circuit diagram when the transverse flux permanent magnet motor of the present disclosure rotates by 1 pole pitch anticlockwise from the position at which the flux is the maximum.

When the rotor of the motor is located at the position in FIG. 2, the flux linkage of the armature winding passes through a rotor yoke part in the axial direction. When the flux linkage of the armature winding at the position reaches the maximum, an equivalent magnetic circuit diagram is as shown in FIG. 7. When the rotor rotates anticlockwise, the relative area of the stator teeth and the rotor teeth is reduced, the magnetic reluctance of the magnetic circuit increases, and the flux linkage of the armature winding is reduced. When the rotor rotates to the position in FIG. 3, the axial flux of the rotor is 0, and the flux linkage of the armature winding is also changed into 0. When the rotor continues rotating to the position in FIG. 4 anticlockwise, the main excitation path is symmetrical with that in FIG. 2, the equivalent magnetic circuit is as shown in FIG. 8, and the axial flux of the rotor has the same magnitude as that in FIG. 7 and opposite direction to that in FIG. 7, namely, $\phi_{ra2}=-\phi_{ra1}$. Symbol meaning in FIG. 7 and FIG. 8: $E_{PM}$ is the magnetic potential provided by one permanent magnet, $R_{PM}$ is the magnetic reluctance of one permanent magnet, $R_{st}$ is the magnetic reluctance of the stator core in the main excitation path 5, 6 or 7 of FIG. 2, FIG. 3 or FIG. 4, $R_{rt}$ is the magnetic reluctance of the rotor tooth part in the main excitation path 5, 6 or 7 of FIG. 2, FIG. 3 or FIG. 4, $R_g$ is the magnetic reluctance of an air gap in the main excitation path 5, 6 or 7 of FIG. 2, FIG. 3 or FIG. 4, and $R_{ra}$ is the axial magnetic reluctance of a rotor yoke part in the main excitation path 5, 6 or 7 of FIG. 2, FIG. 3 or FIG. 4, $\phi_{ra1}$ is the axial flux, provided by the main excitation path 5, of the rotor yoke part, and $\phi_{ra2}$ is the axial flux, provided by the main excitation path 7, of the rotor yoke part.

Figure 9:
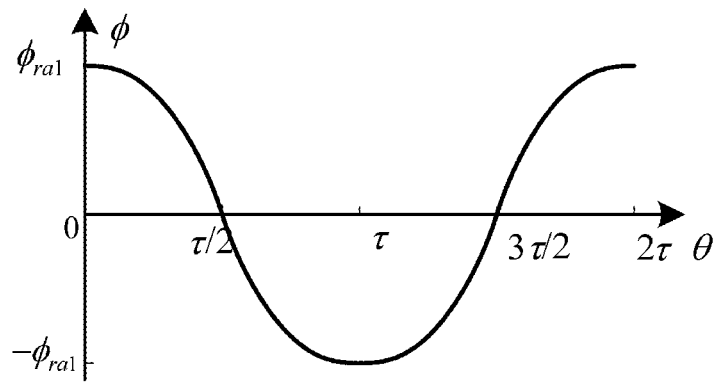
FIG. 9 is a waveform of the winding flux vs. rotor position angle.
Figure 10:
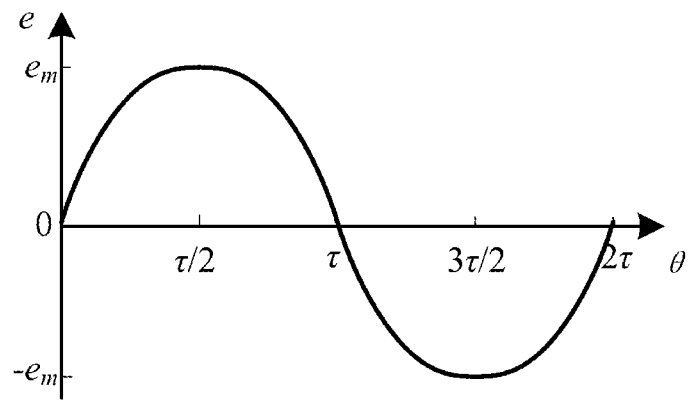
FIG. 10 is a waveform of a counter electromagnetic force vs. a rotor position angle.

After an optimization design, a flux linkage sinusoidally varying with rotor angle can be obtained, and corresponding flux linkage and induced electromotive force waveforms are shown as FIG. 9 and FIG. 10. If the motor is driven by a prime motor, then power generation can be performed. If the current of the same phase is conducted according to a no-load back electromotive force waveform, then the motor can serve as an electric motor to provide torque for a mechanical load. θ is a rotor position angle, and the position in FIG. 2 corresponds to 0 degree of the rotor position angle. τ is a pole pitch angle, which is π/16 rad or 11.25 degrees with respect to the 16-pair pole radial-axial air gap three-phase disc-type transverse flux permanent magnet motor. φ is the flux linkage of a winding, e is the back electromagnetic force, and $e_m$ is a peak value of the counter electromagnetic force.

The implementation manner of the present disclosure is described in detail in combination with the accompanying drawings above, but the present disclosure is not limited to the above implementation manner. Within the scope of knowledge possessed by those of ordinary skill in the art, various changes can be made without departing from the purpose of the present disclosure.

What is claimed is:

1. A radial-axial air gap three-phase disc-type transverse flux permanent magnet motor, comprising a stator, a rotor, and three armature windings, wherein the stator is annular cylindrical, and comprises three sector-shaped annular stator sections of the same structure; each stator section comprises p shoe-shaped permanent magnets and p+1 shoe-shaped stator cores, wherein p is an even number less than or equal to 2k, and k is a positive integer greater than or equal to one; stator sections with grooves are formed by arranging the stator cores and the permanent magnets alternately in the circumferential direction of the stator sections, and a gap exists between two adjacent stator sections; shoe-shaped teeth of the stator cores and shoe-shaped teeth of the permanent magnets form an inner ring of the annular cylindrical stator; the outer sides of the stator cores and the outer sides of the permanent magnets form an outer ring of the stator; in any stator section, any permanent magnet is circumferentially magnetized in the circumferential direction of the stator section, and the magnetization directions of two adjacent permanent magnets are opposite; the rotor is annular cylindrical, and comprises n radial-axial rotor units, where n=3k+1 or 3k+2; the n radial-axial rotor units are connected in sequence; the n radial-axial rotor units are of the same structures; each of the n radial-axial rotor units comprises one radial tooth, first and second axial teeth, and one right-angled yoke; the first and second axial teeth and the radial tooth are arranged on the right-angled yoke; in the rotor, adjacent radial teeth are spaced at a mechanical angle of 360/n degrees; adjacent first axial teeth are spaced at a mechanical angle of 360/n degrees; adjacent second axial teeth are spaced at a mechanical angle of 360/n degrees; the stator is arranged in the rotor; the centers of circles of the stator and the rotor are coincided; the three armature windings are respectively wound in the grooves of the three stator sections.

2. The radial-axial air gap three-phase disc-type transverse flux permanent magnet motor according to claim 1, wherein the radial tooth is arranged on the radial inner side of the right-angled yoke; the first and second axial teeth are respectively arranged on the two axial inner sides of the right-angled yoke; the radial inner sides of the n right-angled yokes form a cylinder inner wall of the annular cylindrical rotor; in each radial-axial rotor unit, the circumferential positions of the first and second axial teeth are aligned with each other; the circumferential position of the radial tooth and the circumferential positions of the first and second teeth are staggered at a mechanical degree of 180/n.

3. The radial-axial air gap three-phase disc-type transverse flux permanent magnet motor according to claim 1, wherein the armature windings are run-track shape armature windings.

4. The radial-axial air gap three-phase disc-type transverse flux permanent magnet motor according to claim 1, wherein the circumferential radians of the second to the pth stator cores of each stator section are U, and the circumferential radians of the first and the (p+1)th stator cores on the outermost side of the stator section are U/2.

5. The radial-axial air gap three-phase disc-type transverse flux permanent magnet motor according to claim 1, wherein tooth parts of the stator cores are laminated by silicon steel sheets or manufactured by soft magnetic composite material; yoke parts of the stator cores are manufactured by compacting soft magnetic composite material.

6. The radial-axial air gap three-phase disc-type transverse flux permanent magnet motor according to claim 1, wherein tooth parts of the rotors of the radial-axial rotor units are laminated by silicon steel sheets or manufactured by soft magnetic composite material; the right-angled yokes are manufactured by compacting soft magnetic composite material.

\* \* \* \* \*

UNITED STATES PATENT AND TRADEMARK OFFICE
CERTIFICATE OF CORRECTION

PATENT NO. : 11,482,915 B2
APPLICATION NO. : 17/191652
DATED : October 25, 2022
INVENTOR(S) : Zhihui Chen, Jiaxin Chen and Jinjin Duan It is certified that error appears in the above-identified patent and that said Letters Patent is hereby corrected as shown below:

In the Specification

At Column 3, Line 1:
--sector-shaped annular stator sections of--
Should read:
--sector-shaped annular stator sections 11 of--.

At Column 3, Lines 5-6:
--Stator sections with grooves--
Should read:
--Stator sections 11 with grooves--.

At Column 3, Line 11:
--form an inner ring of the annular--
Should read:
--form an inner ring 15 of the annular--.

Figure 11:
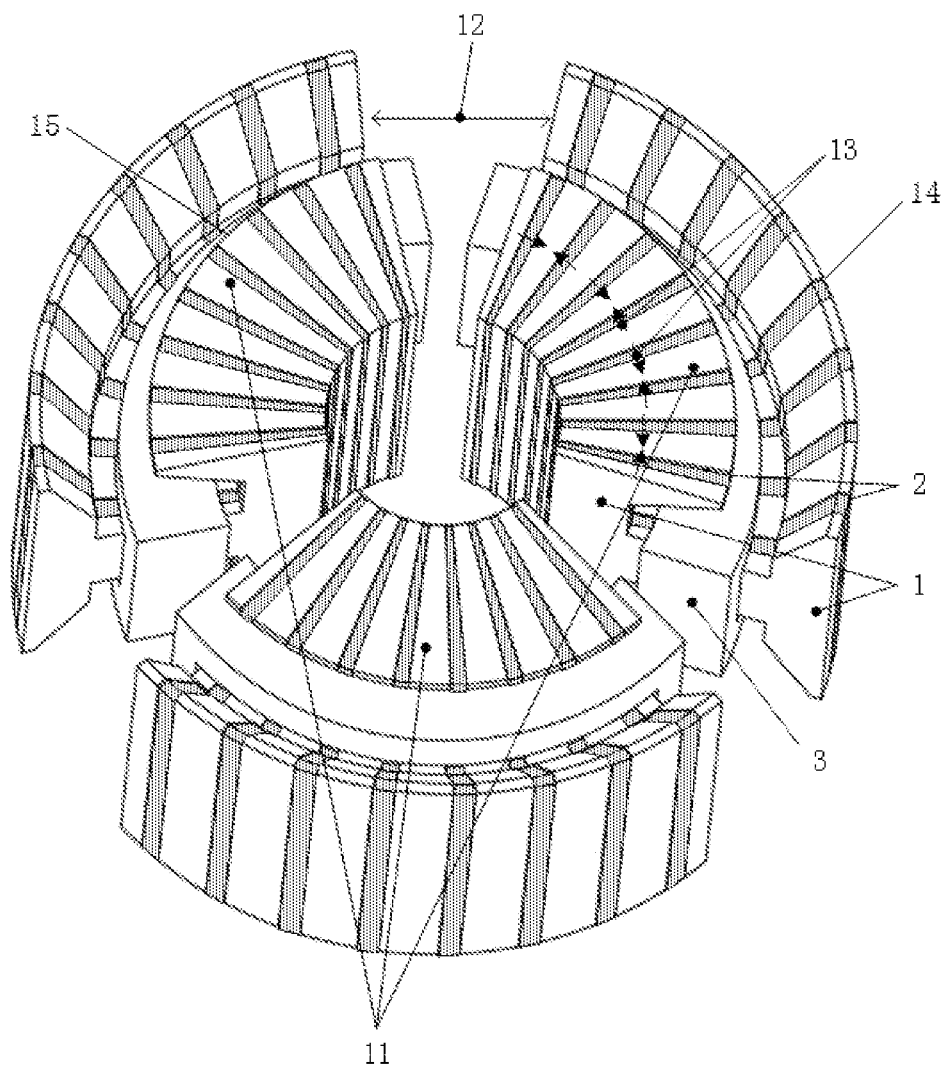

Between Column 4, Line 54 and Column 4, Line 55:
--FIG. 11 is a stator structure of the present disclosure.-- should be inserted.

At Column 4, Line 62:
--10-radial tooth.--
Should read:
--10-radial tooth; 11-stator section; 12-gap; 13-magnetization direction; 14-stator; and 15-inner ring.--.

The section starting at Column 5, Line 4 and ending at Column 5, Line 25:
--As shown in FIGS. 1 to 5, the present disclosure provides a radial-axial air gap three-phase disc-type transverse flux permanent magnet motor, including a stator, a rotor 4, and three armature windings. The stator includes three sector-shaped annular stator sections of the same structure. Each stator Signed and Sealed this
Twenty-third Day of May, 2023

Katherine Kelly Vidal
*Director of the United States Patent and Trademark Office* section includes p shoe-shaped permanent magnets and p+1 shoe-shaped stator cores 1, and p is an even number less than or equal to 2k, and k is a positive integer greater than or equal to one. Stator sections with grooves are formed by arranging the stator cores and the permanent magnets alternately in the circumferential direction; three stator sections form an annular cylindrical stator; a space exists between two adjacent stator sections. Shoe-shaped teeth of the stator cores and shoe-shaped teeth of the permanent magnets form an inner ring of the annular cylindrical stator. The outer sides of the stator cores and the outer sides of the permanent magnets form an outer ring of the annular cylindrical stator. In any stator section, any permanent magnet is circumferentially magnetized in the circumferential direction of the stator section, and the magnetization directions of two adjacent permanent magnets are opposite.--
Should read:
--As shown in FIGS. 1 to 5, the present disclosure provides a radial-axial air gap three-phase disc-type transverse flux permanent magnet motor, including a stator 14, a rotor 4, and three armature windings. The stator 14 includes three sector-shaped annular stator sections 11 of the same structure. Each stator section 11 includes p shoe-shaped permanent magnets and p+1 shoe-shaped stator cores 1, and p is an even number less than or equal to 2k, and k is a positive integer greater than or equal to one. Stator sections 11 with grooves are formed by arranging the stator cores and the permanent magnets 2 alternately in the circumferential direction; three stator sections 11 form an annular cylindrical stator; a space exists between two adjacent stator sections 11. Shoe-shaped teeth of the stator cores and shoe-shaped teeth of the permanent magnets 2 form an inner ring 15 of the annular cylindrical stator 14. The outer sides of the stator cores and the outer sides of the permanent magnets 2 form an outer ring of the annular cylindrical stator 14. In any stator section, any permanent magnet is circumferentially magnetized in the circumferential direction of the stator section, and the magnetization directions 13 of two adjacent permanent magnets 2 are opposite.--.

The section starting at Column 5, Line 37 and ending at Column 5, Line 44:
--The annular cylindrical stator is arranged in the annular cylindrical rotor, and the centers of circles of the annular cylindrical stator and the annular cylindrical rotor are overlapped. The three armature windings 3 are respectively wound in the grooves of the three stator sections, where n is the number of the pole pairs of the radial-axial air gap three-phase disc-type transverse flux permanent magnet motor.--
Should read:
--The annular cylindrical stator 14 is arranged in the annular cylindrical rotor, and the centers of circles of the annular cylindrical stator 14 and the annular cylindrical rotor are overlapped. The three armature windings 3 are respectively wound in the grooves of the three stator sections 11, where n is the number of the pole pairs of the radial-axial air gap three-phase disc-type transverse flux permanent magnet motor.--.

At Column 5, Line 45:
--Two adjacent permanent magnets simultaneously--
Should read:
--Two adjacent permanent magnets 2 simultaneously--.

At Column 5, Line 48:
--the radial outer side of the stator, the radial air gap--

Should read:
--the radial outer side of the stator 14, the radial air gap--.

At Column 6, Line 2:
--stator cores of each stator section are--
Should read:
--stator cores of each stator section 11 are--.

The section starting at Column 6, Line 16 and ending at Column 6, Line 19:
--Each stator section includes eight shoe-shaped permanent magnets and nine shoe-shaped stator cores. The stator cores and the permanent magnets are arranged alternately in the circumferential direction.--
Should read:
--Each stator section 11 includes eight shoe-shaped permanent magnets 2 and nine shoe-shaped stator cores. The stator cores and the permanent magnets 2 are arranged alternately in the circumferential direction.--.

The section starting at Column 6, Line 32 and ending at Column 6, Line 38:
--The permanent magnets are magnetized in the circumferential directions, and the magnetization directions of two adjacent permanent magnets are opposite. The run-track type armature windings are wound in the grooves formed by the stator cores and the permanent magnets after being arranged alternately.--
Should read:
--The permanent magnets 2 are magnetized in the circumferential directions, and the magnetization directions of two adjacent permanent magnets 2 are opposite. The run-track type armature windings are wound in the grooves formed by the stator cores and the permanent magnets 2 after being arranged alternately.--.

At Column 6, Line 57:
--magnetic reluctance of one permanent magnet--
Should read:
--magnetic reluctance of one permanent magnet 2--.